United States Patent [19]

Hattan

[11] 4,417,402
[45] Nov. 29, 1983

[54] GAUGING OF THREAD DIAMETERS

[75] Inventor: Mark Hattan, Orange, Calif.

[73] Assignee: William P. Green, Pasadena, Calif.; a part interest

[21] Appl. No.: 318,557

[22] Filed: Nov. 5, 1981

[51] Int. Cl.³ .......................... G01B 3/48; G01B 5/12
[52] U.S. Cl. ................................................ 33/199 R
[58] Field of Search ......................... 33/199 R, 199 B

[56] References Cited

U.S. PATENT DOCUMENTS

| | | | |
|---|---|---|---|
| 1,714,780 | 5/1929 | Hartness | 33/199 R |
| 1,829,797 | 11/1931 | Hartness | 33/199 R |
| 1,875,872 | 9/1932 | Hoke | 33/199 R |
| 1,877,307 | 9/1932 | Hartness | 33/199 R |
| 1,905,705 | 4/1933 | Hartness | 33/199 R |
| 2,883,760 | 4/1959 | Eriksson | 33/199 R |

FOREIGN PATENT DOCUMENTS 997833  1/1952  France ............................. 33/199 R

OTHER PUBLICATIONS

Southern Gage Co., "Tri-Roll Thread Comparators", Jun. 1979, pp. 1-12.
MTG, "Internal Gaging", May 1981, pp. 1-12.

Primary Examiner—Richard R. Stearns
Attorney, Agent, or Firm—William P. Green

[57] ABSTRACT

The diameter of a thread is measured by screwing two gauge elements into simultaneous engagement with the thread to be measured, then turning the two gauge elements relative to one another to a setting in which their similar threads bear in opposite axial directions against the thread to be measured and confine that thread in a manner holding it against axial movement relative to the gauge elements, after which the diameter of the measured thread is determined by noting the relative rotary position of the two gauge elements, as indicated by relative positions of coacting markings on those parts.

2 Claims, 6 Drawing Figures

GAUGING OF THREAD DIAMETERS

BACKGROUND OF THE INVENTION

This invention relates to improved gauges and methods for measuring the diameter of a thread.

Though various types of gauges have been proposed in the past for measuring the diameter of a thread, none of these with which I am familiar has proven entirely satisfactory. Micrometer gauges can be utilized for the purpose, but are relatively expensive and require special contact elements for engaging the threads to be measured, with resultant difficulties in handling and less than optimum accuracy of measurement in most instances. Because of the difficulty of effectively and reliably measuring a thread, either internal or external, many gauges utilized in industry are merely go/no-go gauges which cannot determine the actual measurement of the thread but merely indicate whether it is less than a particular limiting dimension, or more than a particular limiting dimension.

SUMMARY OF THE INVENTION

The present invention provides gauges which function on a unique principal enabling use of an extremely inexpensive structure which can determine the diameter of a thread very rapidly and positively and without the necessity for complex and difficult manipulation of the gauge parts. The invention can be applied to measurement of both internal and external threads, and utilizes parts which can be very ruggedly built in a manner assuring maintenance of accuracy over a long period of time and without danger of loss of accuracy as a result of wear in handling.

To achieve these results, a gauge embodying the invention includes two gauge elements having similar threads which can be screwed into simultaneous engagement with the thread to be measured, and which are free for rotary movement relative to one another about the axis of the threads but are retained against relative axial movement beyond a predetermined setting. In taking a thread diameter reading, the two gauge elements are turned relative to one another to positions in which they apply force in opposite axial directions against the thread to be engaged, and in effect take up any looseness or play between the gauge elements and the thread being measured in a manner holding the latter against axial movement in either direction relative to the gauge elements. When the parts are in this condition, the diameter of the thread being measured can be determined from the relative rotary setting of the two gauge elements, with markings being provided in association with those two elements for indicating the measurement. Preferably, vernier markings are employed to maximize the accuracy of the reading. Also, the two elements are desirably interconnected in a manner retaining them together while permitting their relative rotation to take a reading.

BRIEF DESCRIPTION OF THE DRAWINGS

The above and other features and objects of the invention will be better understood from the following detailed description of the typical embodiments illustrated in the accompanying drawings, in which.

DESCRIPTION OF THE PREFERRED EMBODIMENTS

Figure 1:
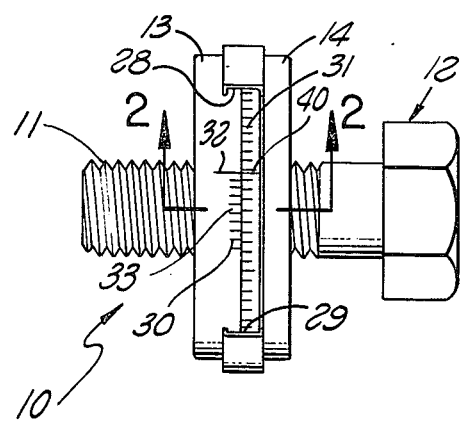
FIG. 1 is a side elevational view of a first form of external thread gauge constructed in accordance with the invention.
Figure 2:
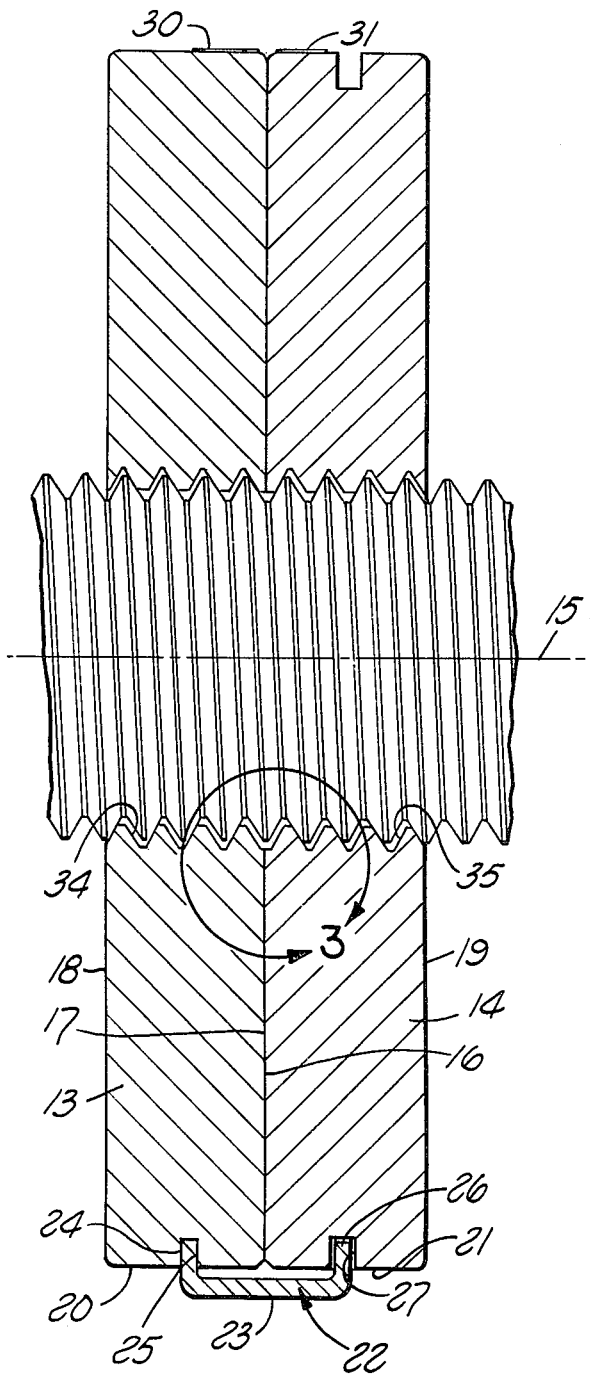
FIG. 2 is an enlarged axial section taken on line 2—2 of FIG. 1.

There is illustrated at 10 in FIG. 1 a thread gauge for measuring the diameter of the external thread 11 of a bolt or other element 12. The device 10 includes two gauge elements 13 and 14 which may be formed of a rigid material such as an appropriate hardened steel machined precisely to shape and capable of maintaining its dimensions precisely in use. The two gauge elements 13 and 14 may be similar flat disc-like parts centered about an axis 15 which during measurements of thread 11 coincides with the axis of that thread. Elements 13 and 14 have annular faces 16 and 17 which are planar and disposed directly transversely of axis 15 and abut one another in the condition of FIG. 2. The outer end faces 18 and 19 of parts 13 and 14 may also be planar and disposed transversely of axis 15, and the outer peripheral surfaces 20 and 21 of the parts are desirably cylindrical about axis 15 and aligned axially with one another. A connector 22 attaches the two elements 13 and 14 together, with their surfaces 16 and 17 abutting or in closely proximate relation as illustrated in FIG. 2, but permits relative rotation of the two elements 13 and 14 about axis 15. For this purpose, connector 22 may have an axially extending partial cylindrical portion 23 centered about axis 15, a radially inwardly turned arcuate portion 24 extending into an arcuate groove 25 in element 13, and a second arcuate radially inwardly turned portion 26 received within a circular groove 27 in element 14. Portion 24 of connector 22 may be locked in fixed position relative to element 13, as by confining portion 24 tightly within groove 25, while the second inturned portion 26 of connector 22 may be somewhat loose fit within groove 27, enabling rotation and very slight axial movement of element 14 relative to connector 22 and element 13. As seen in FIG. 1, connector 22 extends more than 180° about gauge elements 13 and 14 to effectively interconnect them for relative rotation, and prevent separation of these elements, but is interrupted at one location about elements 13 and 14 to provide an arcuate gap between the two extremities 28 and 29 of the connector.

Gauge elements 13 and 14 have scale markings 30 and 31 formed on their peripheral surfaces 20 and 21 and which are visible within the gap between the ends of connector 22. These markings indicate in thousandths of an inch or other units the pitch diameter of a measured external thread 11 on bolt 12, and preferably are of a vernier type to give the reading maximum precision. More particularly, the markings 31 on gauge element 14 may extend entirely about the periphery of that part and constitute a scale marked off in the desired units of thread diameter measurement, while the markings 30 on element 13 include a zero index marking 32 and a series of additional vernier index markings 33 spaced slightly closer together than the markings of scale 31 so that coincidence of any of those additional markings 33 with one of the markings on the scale 31 indicates the final number in an overall vernier reading of the thread diameter.

Figure 3:
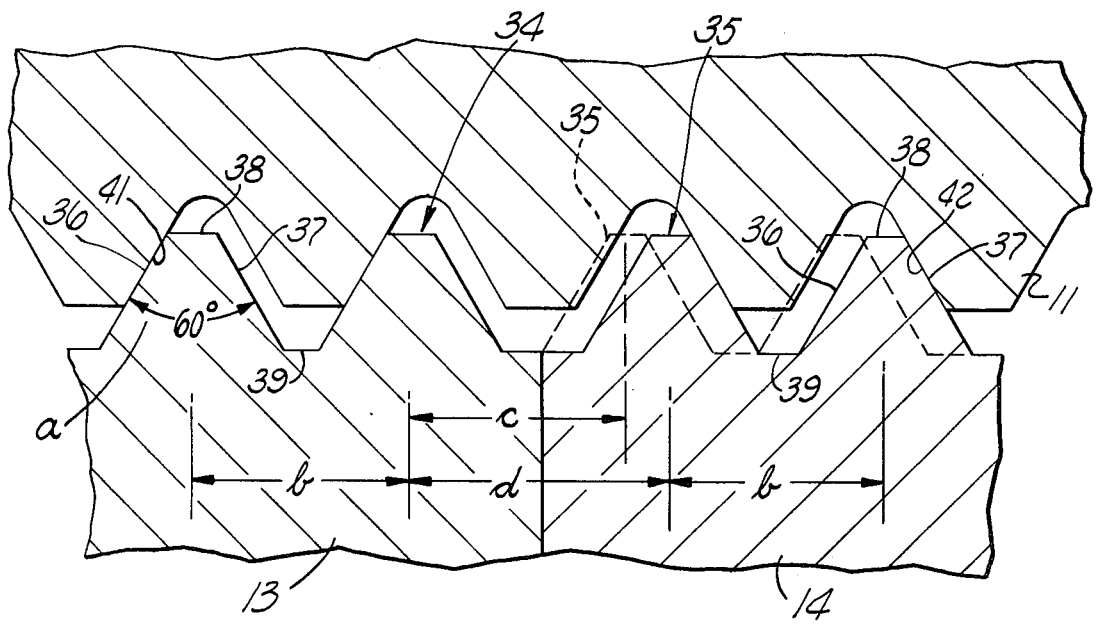
FIG. 3 is a further enlarged detailed view taken in the circle identified by the number 3 in FIG. 2.

Internally, the two gauge elements 13 and 14 have precisely formed identical threads 34 and 35 which are centered about axis 15 and are preferably conventional 60° threads of standard formation similar to that of the standard external thread 11 of bolt 12. As seen in FIG. 3, each of the threads 34 and 35 as viewed in axial section desirably has two opposite side faces 36 and 37 disposed at an included angle a relative to one another which is preferably 60° as mentioned, with axial crest and root surfaces 38 and 39. In one rotary setting of gauge element 14 relative to gauge element 13, the two threads 34 and 35 are so located as to be in effect precisely positioned helical continuations of one another. This position is represented by the full lines of thread 34 in FIG. 3 and the broken line position of thread 35 in that figure. In that setting of the parts, the axial pitch distance b between successive turns of the thread 34 and successive turns of the thread 35 is exactly equal to the pitch distance c between the right hand turn of thread 34 of element 13 and the left hand or nearest turn of thread 35 of element 14. If element 14 is turned from that position about axis 15 in one direction, that relative rotation acts to move the portion of thread 35 which is seen in FIG. 3 rightwardly relative to and away from the corresponding portion of thread 34, to increase the pitch distance between the nearest threads of the elements 13 and 14 to a greater dimension such as that representative at d in FIG. 3. This increase in effective pitch distance is of course directly proportional to the angle through which part 14 is rotated relative to part 13.

In taking a measurement utilizing the device of FIGS. 1, 2 and 3, a user may first turn element 14 about axis 15 relative to element 13 to a predetermined zero position, in which the index marking 32 is directly opposite and aligned with a zero marking 40 on the scale 31, with this being the previously described condition in which thread 35 is at its broken line position of FIG. 3 and the two threads 34 and 35 are therefore oriented to be precise helical continuations of one another exactly aligned helically to engage a coacting thread in the same manner. With elements 13 and 14 in this relative setting, both of these parts can be screwed easily onto the thread 11 to be measured without substantial resistance. After the gauge 10 has reached a position such as that shown in FIG. 1, element 14 can be turned relative to element 13 about axis 15 in a direction shifting thread 35 rightwardly relative to thread 34 as viewed in FIG. 3 (right-hand rotation for right-hand threads and left-hand rotation for left-hand threads), with this action being continued until the leftwardly facing surfaces 36 of thread 34 engage rightwardly facing surfaces 41 of thread 11, while the rightwardly facing surfaces 37 of thread 35 engage the leftwardly facing surfaces 42 of thread 11. When this condition is reached, with end surfaces 16 and 17 of parts 13 and 14 in lightly abutting engagement, further rotation is prevented, and all looseness between the engaging threads is eliminated, thus holding bolt 11 against axial movement in either direction relative to the gauge parts. In that setting of elements 13 and 14, the position of index marking 32 of vernier scale 30 relative to scale 31 indicates the pitch diameter of thread 11 in predetermined units (say thousandths of an inch), while the vernier markings of scale 30 increase the precision of that reading by indicating an additional decimal place. After the reading has been taken, parts 13 and 14 can be turned back to their initial settings and gauge 10 can be easily removed from bolt 12.

Figure 4:
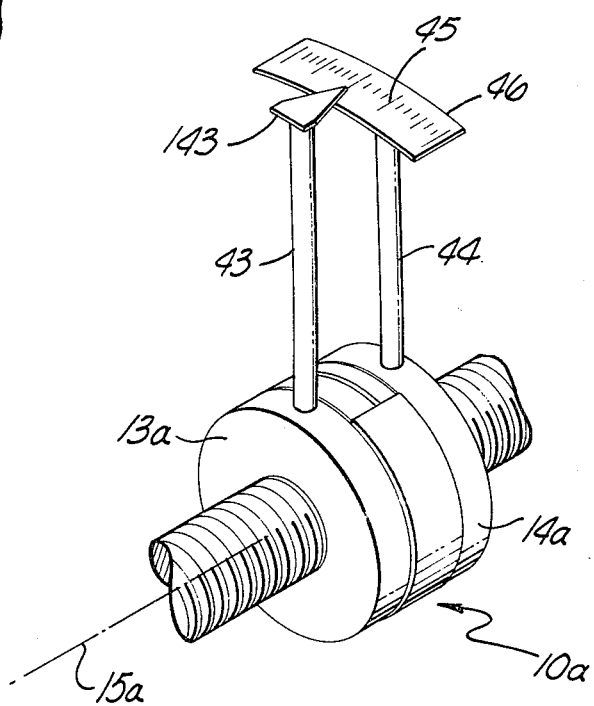
FIG. 4 is a perspective representation of a variational form of the invention.

FIG. 4 shows a variational type of external gauge 10a in which the two elements 13a and 14a may be essentially the same as parts 13 and 14 of the first form of the invention, but instead of the peripheral markings 30 and 31 they may be provided with two radially outwardly projecting arms 43 and 44, one of which may have a pointer end 143 coacting with markings 45 on an arcuate element 46 carried by the other arm, to maximize the precision of the readings by increasing the radial distance of the markings from axis 15a.

Figures 5, 6:
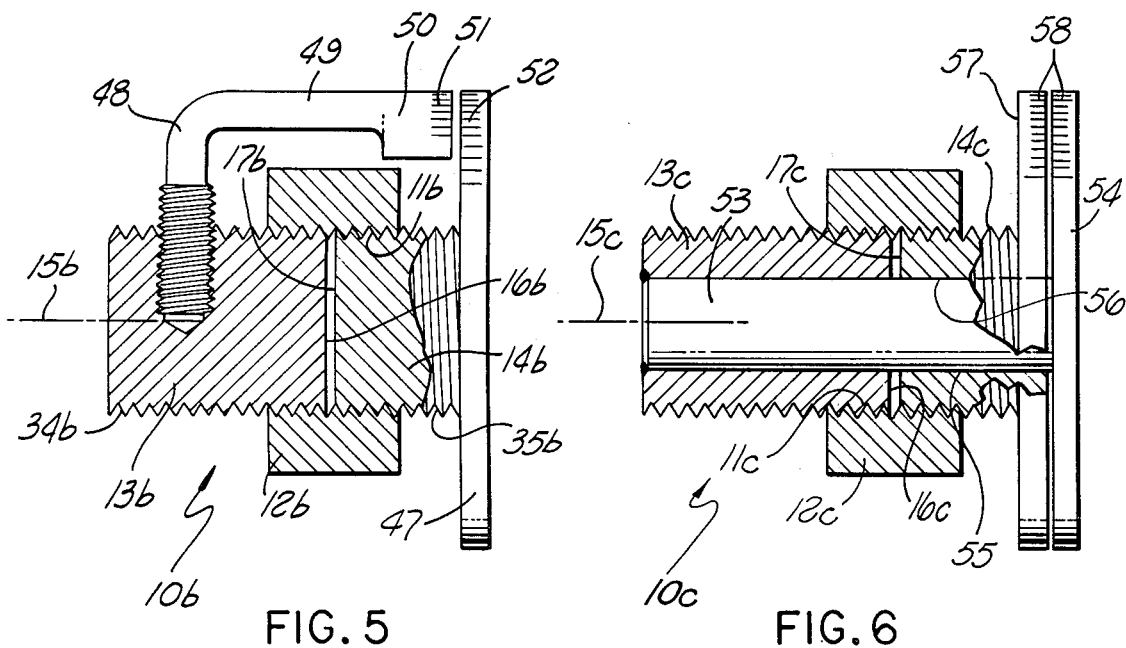
FIGS. 5 and 6 are axial sections through two variational gauges for measuring internal rather than external threads.

FIG. 5 shows an internal gauge embodying the invention, adapted for measuring the diameter of an internal thread 11b of a nut 12b. In this instance, elements 13b and 14b have external threads 34b and 35b and end faces 16b and 17b disposed transversely of axis 15b and engageable with one another to limit movement of parts 13b and 14b relatively together. For indicating the diameter measurement, element 14b may rigidly carry a transverse circular flange part 47, while element 13b may rigidly carry a part 48 projecting radially outwardly and then axially past nut 12b at 49 and having an arcuate portion 50 with markings 51 received closely adjacent and coacting with markings 52 on the periphery of flange 47 to give a thread diameter reading.

The device of FIG. 5 is utilized by first screwing element 13b into one end of nut 12b, then screwing element 14b into the other end of the nut, until end faces 16b and 17b move into engagement and threads 34b and 35b bear in opposite directions against thread 11b as indicated in FIG. 3, to thereby take up looseness between the parts as discussed. When that final condition is reached, the relationship between the vernier markings 51 and 52 will indicate the diameter of thread 11b.

FIG. 6 shows another variational arrangement for measuring the diameter of an internal thread 11c in nut 12c, utilizing two elements 13c and 14c, with the element 13c rigidly carrying a rod 53 projecting axially along and centered about axis 15c and having a circular transverse disc or flange 54 at its end. Rod 53 has a cylindrical portion 55 extending axially through and rotatable within a cylindrical passage 56 in element 14c, with the left end of rod 53 being secured rigidly to part 13c as by welding or other means. At its right end, the second gauge element 14c carries an annular transverse flange 57 which is welded or otherwise secured to element 14c to turn therewith, with the parts 54 and 57 having coacting markings 58 reading in units of diameter of the thread 11c. Parts 13c and 14c have annular transverse shoulder surfaces 16c and 17c which are engageable with one another about rod 53 to limit movement of the two parts 13c and 14c relatively together.

To use the gauge 10c of FIG. 6, parts 13c and 14c are first turned relative to one another to a zero setting of their markings 58 in which the thread of part 14c is a precise helical continuation of the thread of part 13c and discussed in connection with the first form of the invention. In this helically aligned condition of the threads, both of the parts 13c and 14c can be easily screwed into nut 12c to a position such as that represented in FIG. 6, after which part 14c can be turned relative to part 13c in a direction urging surfaces 16c and 17c relatively together in loosely abutting relation, and ultimately causing the threads of parts 13c and 14c to bear in opposite axial directions away from one another against the internal threads of nuts 12c as represented in the full line condition of FIG. 3. When this condition is reached, all looseness and play between the threaded parts is eliminated and nut 12c is effectively retained against even slight axial motion relative to parts 13c and 14c. The diameter of thread 11c and nut 12c is then read directly from the markings 58 on the periphery of flanges 54 and 57, after which part 14c can be turned to its initial position in which the threads are precisely aligned helically for easy removal of the gauge from the nut.

While certain specific embodiments of the present invention have been disclosed as typical, the invention is of course not limited to these particular forms, but rather is applicable broadly to all such variations as fall within the scope of the appended claims.

I claim:

1. A thread gauge comprising:

two gauge elements having similar external threads adapted to engage an internal thread to be measured and which have surfaces acting axially against one another to limit movement of the members toward one another at a predetermined relative axial position;

projections extending from said two elements and having portions extending into close proximity to one another; and markings on said closely proximate portions of said projections for indicating the size of said thread to be measured by reference to the relative rotary setting of said gauge elements;

one of said projections forming a flange extending radially outwardly from one of said gauge elements, and the other of said projections extending radially outwardly from the other gauge element and then axially past said thread to be measured to a location near said flange.

2. A gauge for measuring an internal thread formed within a passage in a member, comprising:

first and second gauge elements which have similar external threads adapted to project into said passage along an axis from opposite ends of the passage and engage different portions of said internal thread;

said gauge elements being free for rotation about said axis relative to one another and being retained against axial movement relative to one another beyond a predetermined relative axial position;

said first gauge element having an indicator portion carried thereby at a first end of said passage;

said second gauge element having an indicator portion carried thereby at the second end of said passage;

said indicator portions extending externally of said passage to locations at which the rotary setting of one can be read against the rotary setting of the other, as a measurement of the size of the internal thread.

* * * * *